US012358220B2

(12) United States Patent
Tang et al.

(10) Patent No.: US 12,358,220 B2
(45) Date of Patent: Jul. 15, 2025

(54) SWITCHING DEVICE AND 3D PRINTING APPARATUS

(71) Applicant: SHENZHEN CREALITY 3D TECHNOLOGY CO., LTD., Guangdong (CN)

(72) Inventors: Jingke Tang, Shenzhen (CN); Dajiang Wu, Shenzhen (CN); Bo Gong, Shenzhen (CN)

(73) Assignee: SHENZHEN CREALITY 3D TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 19/019,015

(22) Filed: Jan. 13, 2025

(65) Prior Publication Data
US 2025/0144876 A1 May 8, 2025

Related U.S. Application Data

(63) Continuation of application No. PCT/CN2023/105141, filed on Jun. 30, 2023.

(30) Foreign Application Priority Data

Jul. 13, 2022 (CN) .......................... 202210820723.0

(51) Int. Cl.
B29C 64/241 (2017.01)
B29C 64/118 (2017.01)
(Continued)

(52) U.S. Cl.
CPC .......... B29C 64/241 (2017.08); B29C 64/118 (2017.08); B29C 64/209 (2017.08);
(Continued)

(58) Field of Classification Search
CPC ... B29C 64/241; B29C 64/118; B29C 64/336; B33Y 30/00
See application file for complete search history.

(56) References Cited

U.S. PATENT DOCUMENTS

2015/0037446 A1* 2/2015 Douglass .............. B29C 64/106
425/131.1
2017/0190109 A1 7/2017 Holland et al.
(Continued)

FOREIGN PATENT DOCUMENTS

CN 104290330 A 1/2015
CN 204914576 U 12/2015
(Continued)

OTHER PUBLICATIONS

International Search Report issued for International Patent Application No. PCT/CN2023/105141, Date of mailing: Sep. 27, 2023, 8 pages including English translation.
(Continued)

Primary Examiner — Galen H Hauth
Assistant Examiner — Mohamed K Ahmed Ali
(74) Attorney, Agent, or Firm — HSML P.C.

(57) ABSTRACT

The present disclosure relates to a switching device and a 3D printing apparatus. The switching device includes a rack, an extrusion assembly, a pushing assembly and a driving assembly. The extrusion assembly is connected to the rack and includes a driving roller and a first pressing wheel and a second pressing wheel located on a circumferential outer side of the driving roller. Transport channels allowing consumables to pass are formed between the driving roller and the first pressing wheel and between the driving roller and the second pressing wheel for passing a consumable. The driving assembly and the pushing assembly are connected to the rack; the pushing assembly includes a pushing portion, and the pushing portion is capable of pushing a target
(Continued)

consumable to move relative to driving roller to a preset position corresponding to the target consumable under a drive of the driving assembly, so as to restrict the target consumable from moving.

15 Claims, 9 Drawing Sheets

(51) Int. Cl.
    *B29C 64/209*     (2017.01)
    *B29C 64/336*     (2017.01)
    *B33Y 30/00*     (2015.01)
    *B33Y 40/00*     (2020.01)

(52) U.S. Cl.
    CPC ............ *B29C 64/336* (2017.08); *B33Y 30/00* (2014.12); *B33Y 40/00* (2014.12)

(56) References Cited

U.S. PATENT DOCUMENTS

| | | |
|---|---|---|
| 2018/0250878 A1 | 9/2018 | Isupov |
| 2019/0084228 A1 | 3/2019 | Chen |
| 2019/0105833 A1 | 4/2019 | Cambron et al. |
| 2020/0324472 A1 | 10/2020 | Barnes et al. |
| 2021/0078247 A1 | 3/2021 | Chen et al. |

FOREIGN PATENT DOCUMENTS

| | | | |
|---|---|---|---|
| CN | 106003727 A | * 10/2016 | ............ B33Y 30/00 |
| CN | 206287529 U | 6/2017 | |
| CN | 108582781 A | 9/2018 | |
| CN | 108621429 A | 10/2018 | |
| CN | 109366994 A | 2/2019 | |
| CN | 109366995 A | 2/2019 | |
| CN | 109366996 A | 2/2019 | |
| CN | 109774126 A | 5/2019 | |
| CN | 109895381 A | 6/2019 | |
| CN | 111267337 A | 6/2020 | |
| CN | 111633985 A | 9/2020 | |
| CN | 112757637 A | 5/2021 | |
| CN | 113001975 A | 6/2021 | |
| CN | 113242786 A | 8/2021 | |
| CN | 215661860 U | 1/2022 | |
| CN | 215791792 U | 2/2022 | |
| CN | 114589924 A | 6/2022 | |
| CN | 216832255 U | 6/2022 | |
| CN | 114734632 A | 7/2022 | |
| CN | 115214137 A | 10/2022 | |
| WO | 2018122390 A1 | 7/2018 | |
| WO | 2021022624 A1 | 2/2021 | |
| WO | 2021162541 A1 | 8/2021 | |
| WO | 2022142956 A1 | 7/2022 | |

OTHER PUBLICATIONS

Written Opinion issued for International Patent Application No. PCT/CN2023/105141, Date of mailing: Sep. 27, 2023, 6 pages including English machine translation.

Grant Decision issued for Chinese Patent Application No. 202210820723.0, dated May 19, 2023, 5 pages.

Office Action issued for Chinese Patent Application No. 202210820723.0, dated Apr. 26, 2023, 7 pages.

* cited by examiner

SWITCHING DEVICE AND 3D PRINTING APPARATUS

CROSS-REFERENCE TO RELATED APPLICATIONS

This application is a continuation of international patent application No. PCT/CN2023/105141, filed on Jun. 30, 2023, which itself claims the Chinese Patent Application No. 2022108207230, filed on Jul. 13, 2022, entitled "SWITCHING DEVICE AND 3D PRINTING APPARATUS", the contents of the above identified applications are hereby incorporated by reference in their entireties.

TECHNICAL FIELD

The present disclosure relates to the field of 3D printing technologies, and in particular, to a switching device and 3D printing apparatus.

BACKGROUND 3D printing device is also referred to as a three-dimensional printer, and is a cumulative manufacturing technology, that is, a rapid forming technology machine. Based on a digital model file, the 3D printing device uses adhesive material such as special wax material, powder metal, plastic and so on, to create a three-dimensional object by printing the adhesive material layer by layer. In an existing 3D printing device with two nozzles, a driving roller is generally provided with two pressing wheels on two sides thereof, and two groups of consumables are alternately transported through rotation of the driving roller. However, when the consumables corresponding to one of the nozzles are transported, the consumables corresponding to the other nozzles are easily interfered with, which has an influence when the printing nozzles are replaced later, and further affects printing efficiency.

SUMMARY

According to various embodiments of the present disclosure, a switching device is provided.

In a first aspect, the present disclosure provides a switching device, which includes a rack, an extrusion assembly, a pushing assembly and a driving assembly. The extrusion assembly is connected to the rack and comprises a driving roller and a first pressing wheel and a second pressing wheel located on a circumferential outer side of the driving roller. Transport channels allowing consumables to pass is formed between the driving roller and the first pressing wheel and between the driving roller and the second pressing wheel. The driving assembly and the pushing assembly are connected to the rack.

The pushing assembly includes a pushing portion, and the pushing portion is capable of pushing a target consumable to move relative to the driving roller to a preset position corresponding to the target consumable under a drive of the driving assembly, so as to restrict movement of the target consumable. The target consumable is one of the consumables located in different transport channels.

In one of the embodiments, the switching device further includes two limiting walls. Setting positions of the two limiting walls are in a one-to-one correspondence with setting positions of the two transport channels. When the target consumable is located at a preset position corresponding to the target consumable, the pushing portion abuts against the limiting wall corresponding to the target consumable.

In one of the embodiments, the two limiting walls are opposite arranged. The pushing portion is located between the two limiting walls, and the pushing portion is capable of moving reciprocally between the two limiting walls under the drive of the driving assembly, such that the target consumable abuts against the limiting wall corresponding to the target consumable.

In one of the embodiments, the switching device further includes a first limiting member connected to the rack.

The first limiting member is provided with two limiting holes extending in a feeding direction of the consumable, and the two limiting holes are located on extension lines of the two transport channels, respectively.

The first limiting member is further provided with a receiving groove. The receiving groove is located between two limiting holes and form a space allowing the pushing portion to move reciprocally between the two limiting walls, and each hole wall of the limiting hole is provided with a notch in communication with the receiving groove.

The limiting wall is formed on a part of the hole wall of the limiting hole on a side opposite to the notch. When the pushing portion moves reciprocally between two limiting walls, the pushing portion enters the limiting hole through the notch, so as to cooperate with the corresponding limiting wall to abut against the target consumable.

In one of the embodiments, the pushing assembly further includes a support plate connected to a power output end of the driving assembly. The first pressing wheel and the second pressing wheel are mounted on the support plate, and the pushing portion is connected to the support plate.

The support plate has a first limiting position and a second limiting position, and the support plate is configured to drive the first pressing wheel and the second pressing wheel to move reciprocally between the first limiting position and the second limiting position under the drive of the driving assembly.

When the support plate moves to the first limiting position, the pushing portion and one of the limiting walls clamp a current target consumable, and the first pressing wheel and the driving roller cooperate to perform a feeding operation on the consumable except the target consumable.

When the support plate is located on the second limiting position, the pushing portion and another limiting walls clamp the current target consumable, and the second pressing wheel and the driving roller cooperate to perform a feeding operation on the consumable except the target consumable.

The current target consumable is a consumable in the consumables that is squeezed by the pushing portion.

In one of the embodiments, the switching device further includes a transmission assembly. The transmission assembly includes a transmission block and a switching member. The switching member is connected to a power output end of the driving assembly, and the transmission block is disposed on the switching member. The pushing assembly is provided with an inclined slot. The transmission block is inserted into the inclined slot. When the driving assembly drives the switching member to move, the transmission block is capable of pushing a slot wall of the inclined slot, so as to move the pushing assembly relative to the driving roller.

In one of the embodiments, the rack is provided with a first limiting slot extending in a direction perpendicular to a feeding direction. The pushing assembly is slidably disposed in the first limiting slot, and the first limiting slot is configured to restrict the pushing assembly from moving in the feeding direction.

In one of the embodiments, the switching device further includes a first nozzle assembly and a second nozzle assembly that are configured to spray molten consumables. The first nozzle assembly and the second nozzle assembly are spaced apart in a direction perpendicular to the feeding direction. The first nozzle assembly is connected to the switching member, and the second nozzle assembly is connected to the rack.

The switching member is configured to drive the first nozzle assembly to move in the feeding direction under the drive of the driving assembly, such that the first nozzle assembly is offset from the second nozzle assembly in the direction perpendicular to the feeding direction, while the first nozzle assembly pushes the pushing assembly to move relative to the driving roller under the drive of the driving assembly.

In one of the embodiments, the driving assembly includes a first driving member and a cam. The cam is connected to a power output end of the first driving member. The cam is provided with a driving slot. The switching member is provided with an engaging block. The engaging block abuts against an inner wall of the driving slot, and the first driving member is configured to drive the cam to drive the engaging block to move in the feeding direction.

In one of the embodiments, the transmission assembly further includes an elastic member and a bump. The bump is connected to the switching member. One end of the elastic member elastically abuts against the rack, and another end of the elastic member elastically abuts against the bump. The elastic member is configured to apply an upward force to the bump, so that a sidewall of the engaging block always abuts against an inner wall of the driving slot.

In one of the embodiments, the driving slot includes a first inner wall and a second inner wall. The first inner wall is located on a side of the second inner wall adjacent to a rotation center of the cam. In a moving direction of the cam, a space between the first inner wall and the rotation center of the cam gradually increases, and a space between the second inner wall and the rotation center of the cam gradually increases. The first inner wall is configured to abut against the engaging block to push the engaging block to move downward, and the second inner wall is configured to abut against the engaging block to pull the engaging block to move upward.

In one of the embodiments, the driving slot further includes a third inner wall and a fourth inner wall. The third inner wall and the fourth inner wall are located at two end portions of the driving slot in a moving direction of the cam. The first inner wall and the second inner wall are located between the third inner wall and the fourth inner wall. The third inner wall and the fourth inner wall are adapted to a shape of the engaging block, and the third inner wall and the fourth inner wall are configured to abut against the engaging block to restrict the engaging block from moving relative to the cam.

In one of the embodiments, a distance between the first inner wall and the second inner wall is greater than an outer contour size of the engaging block.

In one of the embodiments, the driving slot extends through the cam in a thickness direction thereof, and the engaging block is received in the driving slot.

According to various embodiments of the present disclosure, a 3D printing apparatus is provided.

In a second aspect, the present disclosure provides a 3D printing apparatus, which includes the aforementioned switching device.

The details of one or more embodiments of the present disclosure are set forth in the accompanying drawings and the description below. Other features, objects and advantages of the present disclosure will become apparent from the description, drawings and claims.

BRIEF DESCRIPTION OF THE DRAWINGS

To describe the technical solutions in the embodiments or the conventional technologies more clearly, the following briefly describes the accompanying drawings required for describing the embodiments or the conventional technologies. Apparently, the accompanying drawings in the following description show merely the embodiments of the present disclosure, and a person of ordinary skill in the art may still derive other drawings from the disclosed accompanying drawings without creative efforts.

DESCRIPTION OF THE REFERENCE NUMERALS

Figure 1:
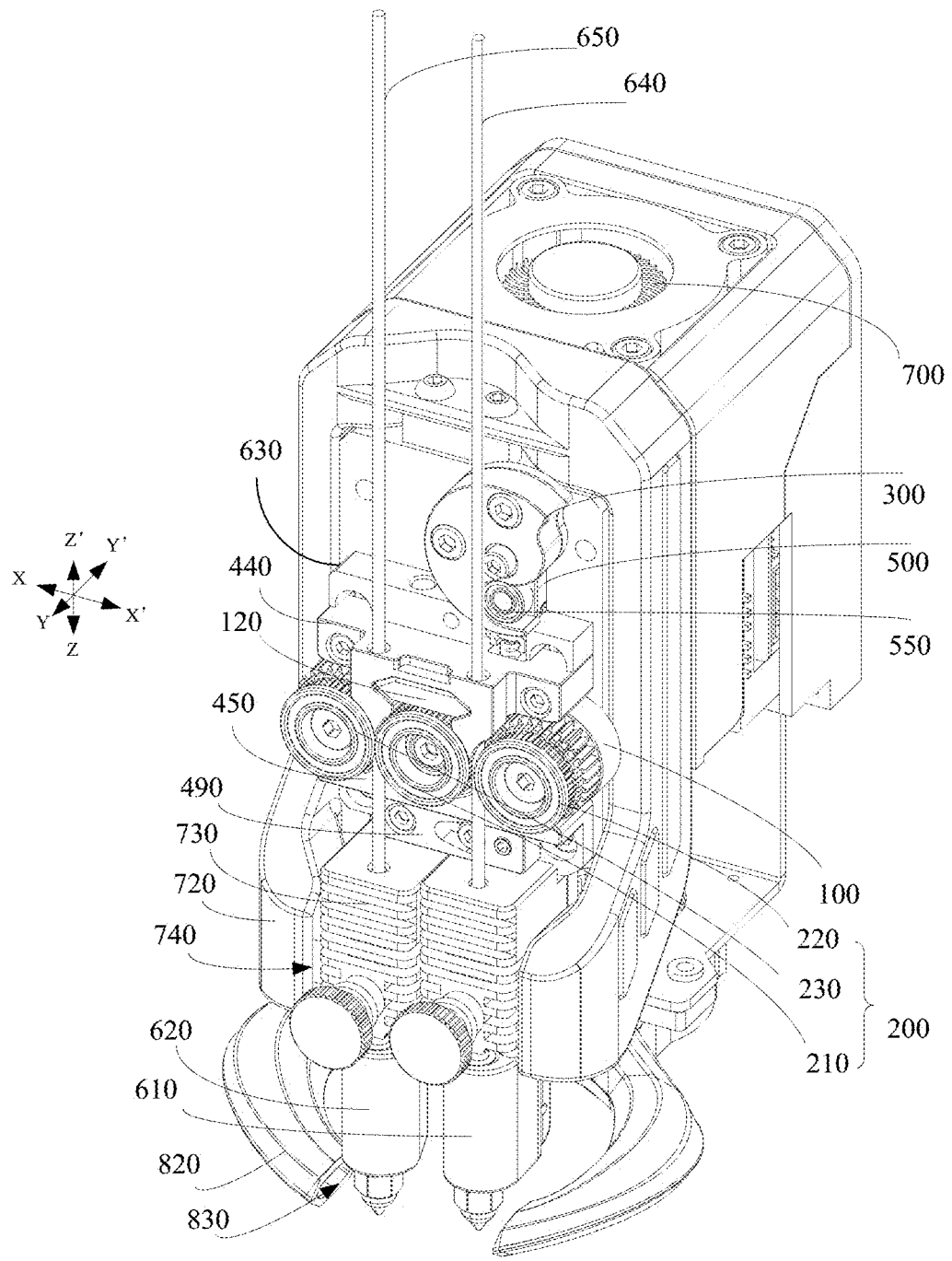
FIG. 1 is a schematic view of a switching device according to an embodiment of the present disclosure.

100: pushing assembly; 110: support plate; 111: inclined slot; 112: avoidance hole; 120: pushing portion; 200: extrusion assembly; 210: driving roller; 220: first pressing wheel; 230: second pressing wheel; 240: transport channel; 250: second driving member; 300: driving assembly; 310: first driving member; 320: cam; 330: driving slot; 331: first groove; 332: second groove; 333: hook; 334: first inner wall; 335: second inner wall; 336: third inner wall; 337: fourth inner wall; 340: rotation center; 420: limiting hole; 421: limiting wall; 430: notch; 440: first limiting member; 441: receiving groove; 442: guide block; 443: avoidance slot; 444: abutting block; 450: second limiting member; 460: stopper; 470: first limiting slot; 480: second limiting slot; 490: limiting bar; 500: transmission assembly; 510: switching member; 520: transmission block; 530: elastic member; 540: bump; 550: engaging block; 551: bearing; 552: protrusion portion; 610: first nozzle assembly; 620: second nozzle assembly; 630: rack; 640: first consumable 650: second consumable; 660: first nozzle; 670: second nozzle; 700: heat dissipation assembly; 710: heat dissipation member; 720: first air guide member; 730: heat dissipation block; 740: air vent.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely some rather than all of the embodiments of the present disclosure. Based on the embodiments of the present disclosure, all other embodiments obtained by a person of ordinary skill in the art without creative efforts fall within the protection scope of the present disclosure.

In order to make the aforementioned objects, features and advantages of the present disclosure more clearly understood, the specific embodiments of the present disclosure will be described in detail below with reference to the accompanying drawings. In the following description, numerous specific details are set forth in order to provide a thorough understanding of the present disclosure. However, the present disclosure can be implemented in many other ways different from those described herein, and those skilled in the art can make similar improvements without departing from the connotation of the present disclosure. Therefore, the present disclosure is not limited by the specific embodiments disclosed below.

In the description of the present disclosure, it is necessary to understand that the azimuth or positional relationship indicated by the terms "center," "longitudinal," "transverse," "length," "width," "thickness," "up," "down," "front," "rear," "left," "right," "vertical," "horizontal," "top," "bottom," "inner," "outer," "clockwise," "counterclockwise," "axial," "radial," circumferential," etc., is based on the azimuth or positional relationship shown on the accompanying drawings, solely for the purpose of facilitating the description of the present disclosure and simplifying the description, and not that the device or element indicated or implied must have a specific azimuth, be constructed and operated in a specific azimuth, and therefore cannot be understood as a limitation of the present disclosure.

In addition, the terms "first" and "second" are only used for descriptive purposes, and should not be construed as indicating or implying relative importance or implying the number of indicated technical features. Thus, a feature delimited with "first" or "second" may expressly or implicitly include at least one of that feature. In the description of the present disclosure, "multiple" means at least two, such as two, three, etc., unless otherwise expressly and specifically limited.

In the present disclosure, unless otherwise specified and limited, the terms "mount," "connect," "connect together," "fix" and other terms shall be understood broadly, for example, there may be a fixing connection, a detachable connection, or integrated molding; there may be a mechanical connection or an electrical connection; there may be a direct connection or an indirect connection through an intermediate medium, and there may be a connection within two elements or an interaction between two elements, unless otherwise expressly limited. For ordinary technical people in the art, the specific meaning of the aforementioned terms in the present disclosure can be understood according to the specific circumstances.

In the present disclosure, unless otherwise expressly provided and defined, the first feature "on" or "under" the second feature may mean that the first feature and the second feature are directly contacted, or the first feature and the second feature are indirectly contacted by an intermediate medium. Also, the first feature is "above", "over" and "on" the second feature may mean that the first feature is directly above or obliquely above the second feature, or simply means that the first feature has a higher level than the second feature. The first feature being "below", "beneath" and "under" the second feature may mean that the first feature is directly or obliquely below the second feature, or simply means that the first feature has a lower level than the second feature.

It should be noted that when an element is referred to as being "fixed to" or "disposed on" another element, it can be directly on the other element or an intervening element may also be present. When an element is considered to be "connected to" another element, it can be directly connected to another element or indirectly connected to another element with a mediating element. The terms "vertical," "horizontal," "up," "down," "left," "right" and similar expressions used herein are for illustrative purposes only and are not intended to be the only means of implementation.

The details of one or more embodiments of the present disclosure are set forth in the accompanying drawings and the description below.

Referring to FIG. 1, FIG. 1 is a schematic view of a switching device according to an embodiment of the present disclosure. An embodiment of the present disclosure provides a switching device for a three-dimensional (3D) printing apparatus. The switch device includes a rack 630, an extrusion assembly 200, a pushing assembly 100, and a driving assembly 300. The extrusion assembly 200 is connected to the rack 630. The extrusion assembly 200 includes the driving roller 210, and the first pressing wheel 220 and the second pressing wheel 230 that are located on the outer circumferential side of the driving roller 210. Transport channels 240 allowing consumables to pass are formed between the driving roller 210 and the first pressing wheel 220, and between the driving roller 210 and the second pressing wheel 230. Both the driving assembly 300 and the pushing assembly 100 are connected to the rack 630. The pushing assembly 100 includes the pushing portion 120, and the pushing portion 120 is capable of pushing a target consumable to move relative to the driving roller 210 to a preset position corresponding to the target consumable under a drive of the driving assembly, so as to restrict the target consumable from moving. The target consumable is one of consumables located in different transport channels 240.

Specifically, according to an embodiment of the present disclosure, the driving assembly 300 drives the pushing portion 120 to move relative to the driving roller 210, so that the target consumable can move to a preset position corresponding to the target consumable, so as to restrict the target consumable from moving, so that when the driving roller 210 rotates to move another consumable located in the transport channel 240, the target consumable can be kept in a current position without being subjected to the interference of rolling of the driving roller 210, so as to avoid a movement of the target consumable in a direction opposite to a direction in which a transport direction is required. In this case, when a nozzle assembly is switched or a target consumable needs to be converted into a to-be-printed consumable later and performs an operation of continue printing, the position of the to-be-printed consumable doesn't need to be adjusted, and the printing may be directly performed, thereby improving printing efficiency. It should be noted that both the transport channel 240 formed between the driving roller 210 and the first pressing wheel 220 and the transport channel 240 formed between the driving roller 210 and the second pressing wheel 230 are provided with consumables therein. One consumable that is restrict from moving is the target consumable. For ease of description, another consumable to be transported is defined as the to-be-printed consumable.

Figure 2:
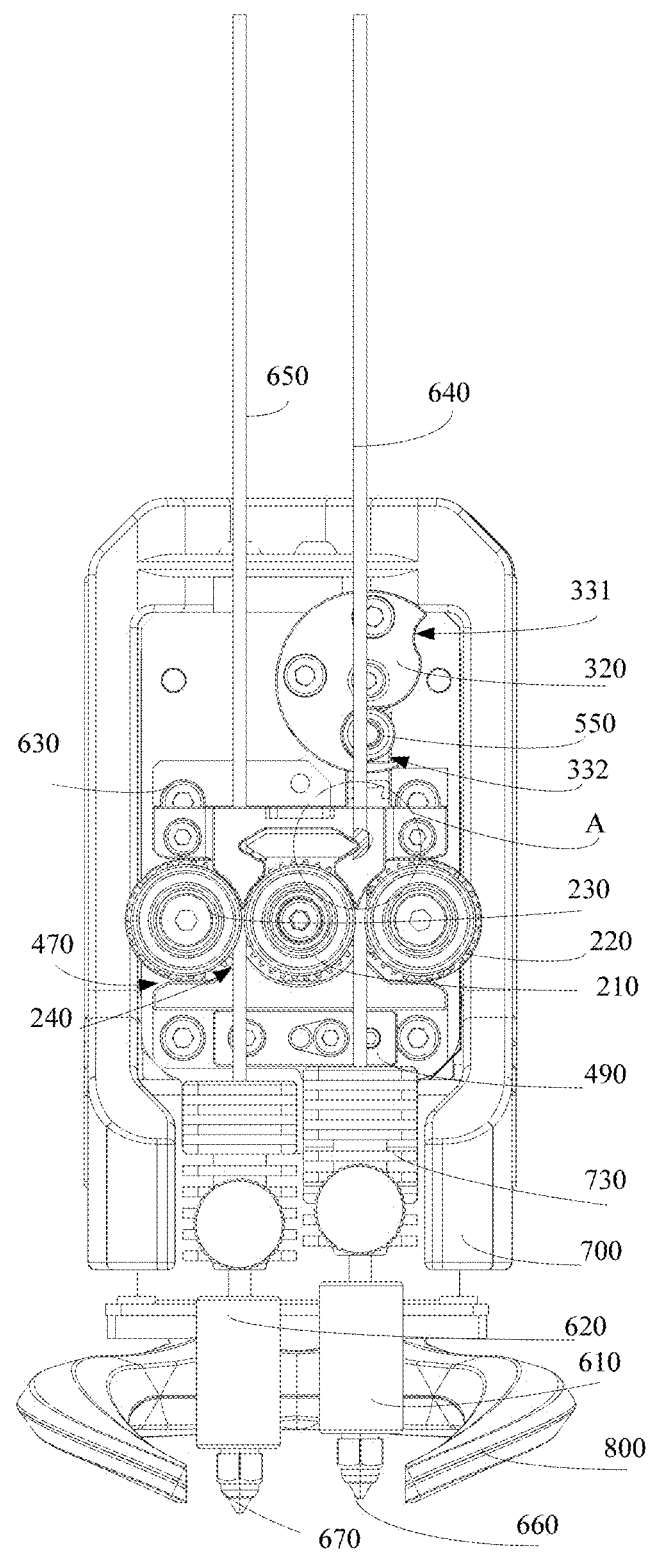
FIG. 2 is a front view of a switching device according to an embodiment of the present disclosure.
Figure 3:
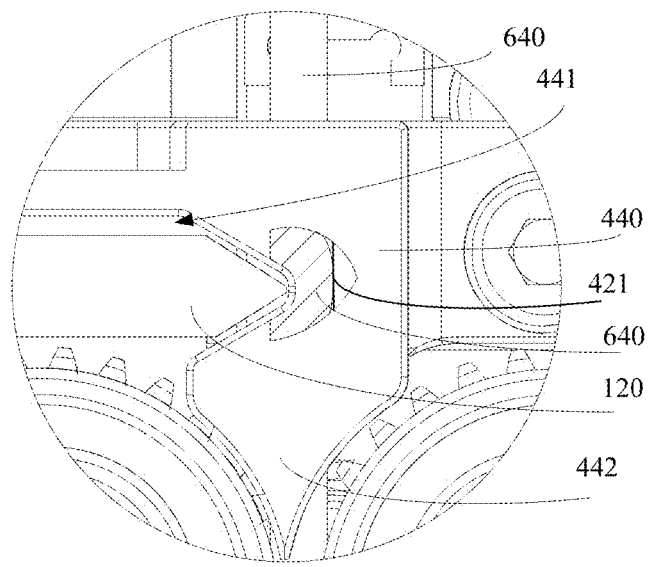
FIG. 3 is an enlarged view of portion A in FIG. 2.

Referring to FIG. 1, FIG. 2, and FIG. 3, FIG. 2 is a front view of a switching device according to an embodiment of the present disclosure; FIG. 3 is an enlarged view of portion A in FIG. 2. In one of the embodiments, the switching device further includes two limiting walls 421. Setting positions of the two limiting walls 421 are in a one-to-one correspondence with setting positions of the two transport channels 240. When the target consumable is located at a preset position corresponding to the target consumable, the pushing portion 120 abuts against the limiting wall 421 corresponding to the target consumable.

Specifically, each transport channel 240 has a corresponding limiting wall 421. When the target consumable is located at the preset position corresponding to the target consumable, one side of the target consumable abuts against the limiting wall 421 corresponding to the target consumable, and the other side of the target consumable abuts against the pushing portion 120. The target consumable is clamped by the pushing portion 120 and the corresponding limiting wall 421, so as to be limited to the corresponding preset position. When the driving roller 210 rotates to transport another consumable located in the transport channel 240, the driving roller 210 applies a force to the to-be-printed consumable in a feeding direction, and the target consumable is disposed on a side of the driving roller 210 away from the to-be-printed consumable, and the driving roller 210 applies a force to the target consumable that is opposite to the feeding direction. However, when the target consumable is clamped at the preset position, the target consumable can be kept stationary under driving of the driving roller 210, so that a return of the target consumable can be avoided. When an operation of switching the nozzle assembly is performed, a position of the to-be-printed consumable does not need to be adjusted, and printing may be directly performed, thereby improving printing efficiency.

Referring to FIG. 1, FIG. 2, FIG. 3 and FIG. 4, FIG. 4 is a partial explosive view of a switching device according to an embodiment of the present disclosure. In one of the embodiments, the two limiting walls 421 are opposite arranged. The pushing portion 120 is located between two limiting walls 421, and the pushing portion 120 is capable of moving reciprocally between the two limiting walls 421 under the drive of the driving assembly 300, such that the target consumable abuts against the limiting wall 421 corresponding to the target consumable.

Specifically, when the driving assembly 300 drives the pushing portion 120 to move toward the first pressing wheel 220, a consumable in the transport channel 240 formed by the driving roller 210 and the first pressing wheel 220 is the target consumable, and the pushing portion 120 pushes the target consumable to move in a direction away from the driving roller 210 to a corresponding preset position, so that the target consumable is clamped by the pushing portion 120 and the corresponding limiting wall 421, so that when the driving roller 210 rotates relative to the second pressing wheel 230, the consumable in the transport channel 240 formed by the driving roller 210 and the second pressing wheel 230 can be transported.

When the driving assembly 300 drives the pushing portion 120 to move towards the second pressing wheel 230, the consumable in the transport channel 240 formed by the driving roller 210 and the second pressing wheel 230 is the target consumable, and the pushing portion 120 pushes the target consumable to move in a direction away from the driving roller 210 to a corresponding preset position, so that the target consumable is clamped by the pushing portion 120 and the corresponding limiting wall 421, so that when the driving roller 210 rotates relative to the first pressing wheel 220, the consumable in the transport channel 240 formed by the driving roller 210 and the first pressing wheel 220 can be transported.

Referring to FIG. 1, FIG. 2, FIG. 3 and FIG. 5, FIG. 5 is a schematic view of a first limiting member in a switching device according to an embodiment of the present disclosure. In one of the embodiments, the switching device further includes a first limiting member 440 connected to the rack 630. The first limiting member 440 is provided with two limiting holes 420 extending in the feeding direction of consumables, and the two limiting holes 420 are located on extension lines of the two transport channels 240. The first limiting member 440 is further provided with a receiving groove 441. The receiving groove 441 is located between two limiting holes 420 and forms a space allowing the pushing portion 120 to move reciprocally between the two limiting walls 421. A hole wall of each limiting hole 420 is provided with a notch 430 in communication with the receiving groove 441. A part of the hole wall of the limiting hole 420 that is opposite to the notch 430 forms a limiting wall 421. The pushing portion 120 enters the limiting hole 420 through the notch, so as to cooperate with the corresponding limiting wall 421 to abut against the target consumable when the pushing portion 120 moves reciprocally between two limiting walls 421.

Specifically, the pushing portion 120 is received in the receiving groove 441, and a consumable located in the transport channel 240 is received in the limiting hole 420. When the pushing portion 120 moves toward the limiting hole 420 in which the target consumable is located under the drive of the driving assembly 300, one end of the pushing portion 120 extends from a corresponding notch 430 into the limiting hole 420, so that one end of the target consumable away from the pushing portion 120 abuts against the corresponding limiting wall 421, so as to limit the target consumable.

Further, the feeding direction coincides with a vertical direction. When the driving roller 210 rotates to drive the to-be-printed consumable to move downward, under a gravity action, the to-be-printed consumable can move downward more stably in the vertical direction.

Further, the limiting hole 420 extends in a vertical direction and is located above the transport channel 240, and the consumables extend in the vertical direction from the limiting hole 420 to the transport channel 240. When the driving roller 210 drives the consumables to be transported downward, the limiting hole 420 can guide the to-be-printed consumable, so that the consumables can be accurately transported downward in the vertical direction.

In addition, the first pressing wheel 220, the second pressing wheel 230, and the driving roller 210 are located on the same horizontal line, so that the to-be-printed consumable can be stably compressed by the first pressing wheel 220 and the driving roller 210 or be abutted by the second pressing wheel 230 and be stably compressed by the driving roller 210. When the driving roller 210 rotates, the driving roller 210 can apply an inverse frictional force that are downward in the vertical direction to the to-be-printed consumable, thereby driving the to-be-printed consumable to move downward.

It should be noted that, for ease of description, in FIG. 1 of the specification, XX' is defined as a left-right direction, YY' is defined as a front-back direction, and ZZ' is defined as an up-down direction. In the following embodiments, description is performed based on the direction described in FIG. 1.

Referring to FIG. 1, FIG. 3, FIG. 5 and FIG. 6, FIG. 6 is a partial schematic view of a switching device according to an embodiment of the present disclosure. In one of the embodiments, the pushing assembly 100 further includes a support plate 110 connected to a power output end of the driving assembly 300. The first pressing wheel 220 and the second pressing wheel 230 are mounted on the support plate 110. The pushing portion 120 is connected to the support plate 110. The support plate 110 has a first limiting position and a second limiting position, and the support plate 110 is configured to drive the first pressing wheel 220 and the second pressing wheel 230 to move reciprocally between the first limiting position and the second limiting position under the drive of the driving assembly 300. When the support plate 110 moves to the first limiting position, the pushing portion 120 and one of the limiting walls 421 clamp a current target consumable, and the first pressing wheel 220 and the driving roller 210 cooperate to perform a feeding operation on the consumable except the target consumable. When the support plate 110 is in the second limiting position, the pushing portion 120 and the other limiting wall 421 clamp the current target consumable, and the second pressing wheel 230 and the driving roller 210 cooperate to perform the feeding operation on the consumables except the target consumable. The current target consumable is a consumable in the consumable that is squeezed by the pushing portion 120.

Specifically, when the consumable in the transport channels 240 formed by the first pressing wheel 220 and the driving roller 210 are the target consumable, the driving assembly 300 drives the support plate 110 to move to the first limiting position, the first pressing wheel 220, the second pressing wheel 230, and the pushing portion 120 move synchronously with the support plate 110. The pushing portion 120 pushes the target consumable, and one end of the pushing portion 120 extends from a corresponding notch 430 to a corresponding limiting hole 420, and the target consumable abuts against the corresponding limiting wall 421. The first pressing wheel 220 moves away from the driving roller 210 in the left-right direction, so that a space between the first pressing wheel 220 and the driving roller 210 increases, and the target consumable is separated from the first pressing wheel 220. Therefore, when the driving roller 210 rotates, an upward reverse friction force exerted by the driving roller 210 on the target consumable can be reduced, so that the target consumable is stably limited to the preset position. The second pressing wheel 230 approaches the driving roller 210 in a left-right direction, so that a spacing between the second pressing wheel 230 and the driving roller 210 decreases. The to-be-printed consumable is compressed by an outer peripheral surface of the second pressing wheel 230 and an outer peripheral surface of the driving roller 210, so that when the driving roller 210 rotates, a downward reverse friction force exerted by the driving roller 210 on the target consumable can be increased, so that the to-be-printed consumable can be transported.

When the consumables in the transport channels 240 formed by the second pressing wheel 230 and the driving roller 210 are the target consumables, the driving assembly 300 drives the support plate 110 to move to the second limiting position, and the first pressing wheel 220, the second pressing wheel 230, and the pushing portion 120 move synchronously with the support plate 110. The specific motion process is similar to the foregoing description, which will be not described again. In the present disclosure, the support plate 110 is driven by the driving assembly 300 to move, so that the first pressing wheel 220, the second pressing wheel 230, and the pushing portion 120 move synchronously with the support plate 110. Therefore, a limiting to the target consumable is implemented, and interference of the driving roller 210 on the target consumable is reduced. In addition, the driving force of the driving roller 210 on the to-be-printed consumable increases, thereby improving transport efficiency of the to-be-printed consumable, and further improving printing efficiency.

In other embodiments, when the target consumable is located in the preset position, the target consumable can be pushed away from the driving roller 210 by the pushing portion, that is, the target consumable is not in contact with the driving roller 210. When the driving roller 210 rotates to transport the to-be-printed consumable, the target consumable is stably limited in the preset position without being subjected to the driving force of the driving roller 210.

Figure 4:
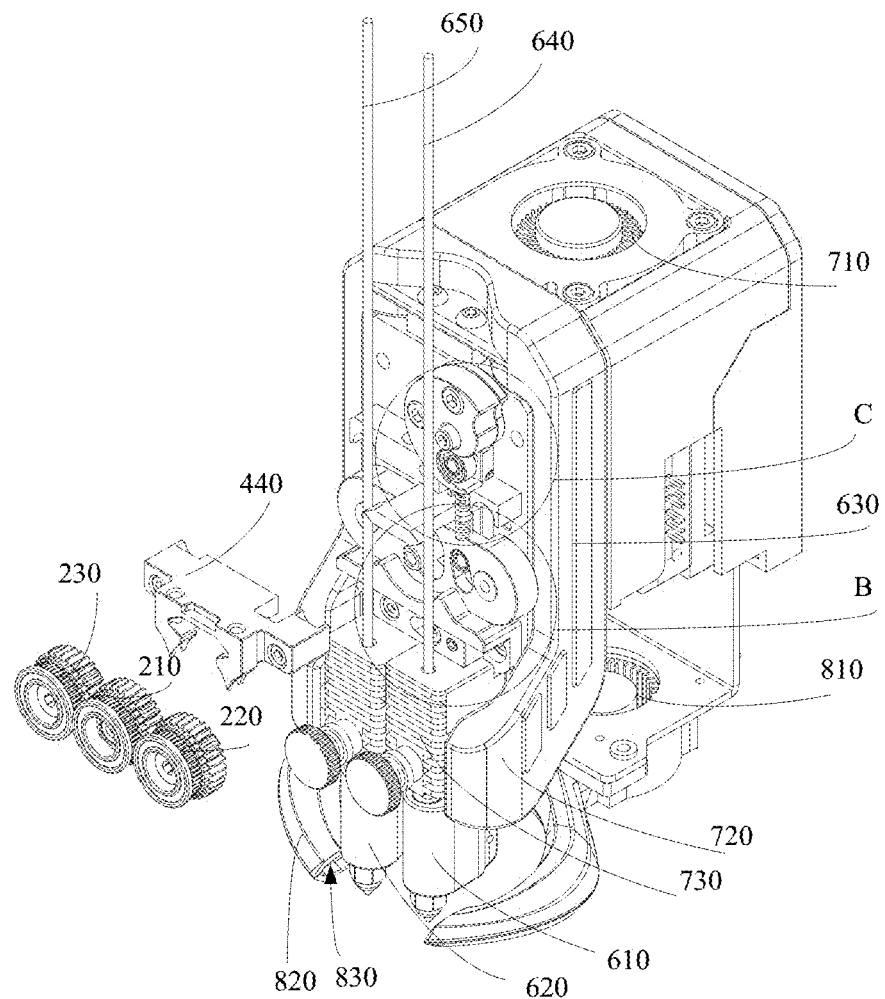
FIG. 4 is a partial explosive view of a switching device according to an embodiment of the present disclosure.

Referring to FIG. 1, FIG. 4, FIG. 5 and FIG. 7, FIG. 7 is an enlarged view of portion B in FIG. 4. In one of the embodiments, the switching device further includes a transmission assembly 500. The transmission assembly 500 includes a transmission block 520 and a switching member 510. The switching member 510 is connected to a power output end of the driving assembly 300, and the transmission block 520 is disposed on the switching member 510. The pushing assembly 100 is provided with an inclined slot 111. The transmission block 520 is inserted into the inclined slot 111. When the driving assembly 300 drives the switching member 510 to move, the transmission block 520 is capable of pushing a slot wall of the inclined slot 111 to move the support plate 110 relative to the driving roller 210.

Specifically, the support plate 110 is slidably connected to the rack 630 in a left-right direction. The inclined slot 111 is a strip slot. An extension direction of the inclined slot 111 is inclined relative to a moving direction of the switching member 510, and the inclined slot 111 is inclined upward in a direction from first pressing wheel 220 to second pressing wheel 230. FIG. 1 is used as an example for description. In this embodiment, the first pressing wheel 220 is located on a right side of the driving roller 210, and second pressing wheel 230 is located on a left side of the driving roller 210. That is, the inclined slot 111 is inclined upward from right to left. For ease of description, a consumable between the driving roller 210 and the first pressing wheel 220 is defined as a first consumable 640, and a consumable between driving roller 210 and second pressing wheel 230 is defined as a second consumable 650.

Further, the driving assembly 300 is configured to drive the switching member 510 to move in a vertical direction. When the driving assembly 300 drives the switching member 510 to move upward, the switching member 510 drives the transmission block 520 to move upward, and the transmission block 520 is inserted into the inclined slot 111, and the transmission block 520 applies a force that is inclined upward from right to left on a slot wall of the inclined slot 111, so that the support plate 110 drives the first pressing wheel 220 and the second pressing wheel 230 to move rightward, so that the second pressing wheel 230 and the driving roller 210 are adjacent to each other to squeeze the second consumable 650, and the first pressing wheel 220 and the driving roller 210 are away from each other, so that the first consumable 640 between the second pressing wheel 230 and the driving roller 210 can not be compressed by the first pressing wheel 220 and the driving roller 210, that is, in the current state, the second consumable 650 is the to-be-printed consumable and the first consumable 640 is a target consumable.

When the driving assembly 300 drives the switching member 510 to move downward, the switching member 510 drives the transmission block 520 to move downward. In the current state, the first consumable 640 is the to-be-printed consumable, and the second consumable 650 is the target consumable. Specific analysis is similar to the foregoing embodiments, and details will not be described again.

In other embodiments, the driving assembly 300 may drive the switching member 510 in other directions as long as it can be implemented that the switching member 510 drives the support plate 110 in a horizontal direction during the moving process.

Figure 5:
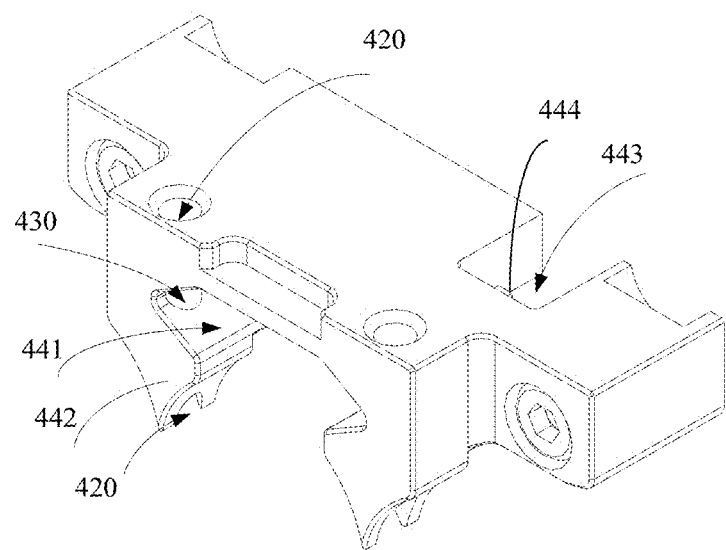
FIG. 5 is a schematic view of a first limiting member in a switching device according to an embodiment of the present disclosure.
Figure 6:
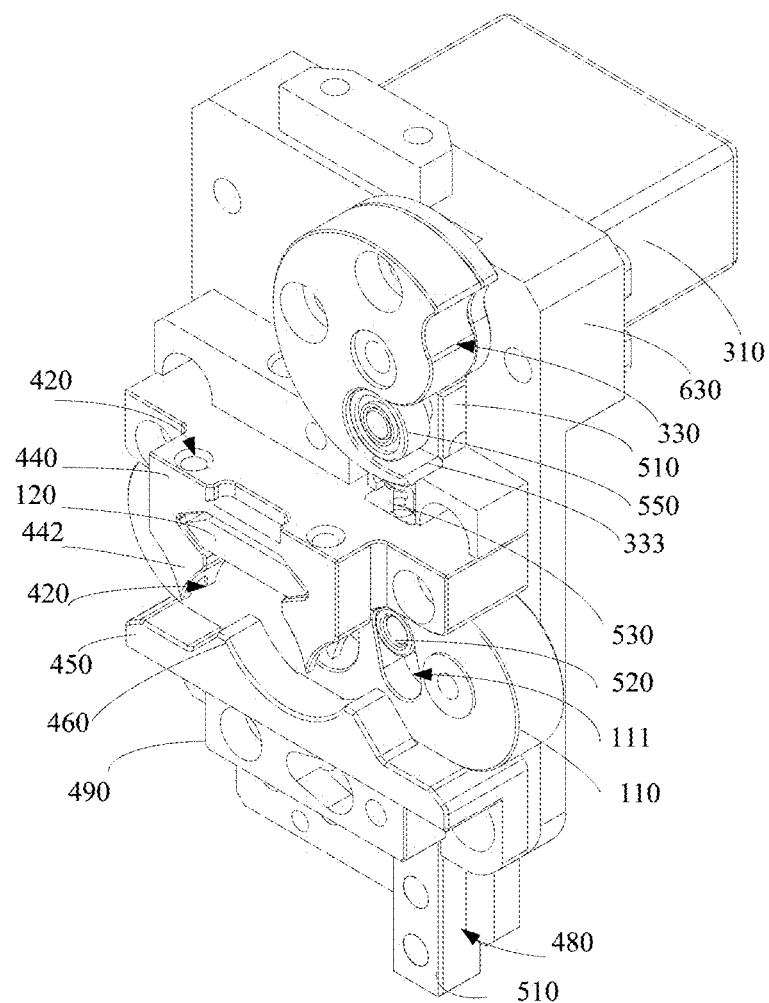
FIG. 6 is a partial schematic view of a switching device according to an embodiment of the present disclosure.

Referring to FIG. 1, FIG. 5 and FIG. 6, FIG. 6 is a partial schematic view of a switching device according to an embodiment of the present disclosure. In one of the embodiments, the rack 630 is provided with a first limiting slot 470 extending in a direction perpendicular to the feeding direction. The pushing assembly 100 is slidably disposed in the first limiting slot 470, and the first limiting slot 470 is configured to restrict the pushing assembly 100 from moving in the feeding direction.

Specifically, the first limiting slot 470 extends in the left-right direction, so as to restrict a degree of freedom of movement of the support plate 110, so that the support plate 110, when driven by the transmission block 520, can only move in a left direction or a right direction, so that the support plate 110 can accurately move to the first limiting position and the second limiting position.

In one of the embodiments, the switching device further includes a second limiting member 450 connected to the rack 630. The second limiting member 450 and the first limiting member 440 are spaced apart in the feeding direction. A first limiting slot 470 is formed among the rack 630, the second limiting member 450 and the first limiting member 440. The pushing assembly 100 is slidably disposed in the first limiting slot 470, and the first limiting slot 470 is configured to restrict the pushing assembly 100 from moving in the feeding direction.

Specifically, the support plate 110 is slidably disposed in the first limiting slot 470. When the driving assembly 300 drives the switching member 510 to drive the transmission block 520 to move upward, the transmission block 520 applies a force that is inclined upward from left to right to the slot wall of the inclined slot 111, and the support plate 110 can move only in the left-right direction, so that the support plate 110 drives the first pressing wheel 220 and the second pressing wheel 230 to move rightward, so that the support plate 110 accurately moves to the first limiting position. When the driving assembly 300 drives the switching member 510 to drive the transmission block 520 downward, the transmission block 520 applies a force that is inclined downward from right to left to the slot wall of the inclined slot 111, and the support plate 110 can only move in the left-right direction, so that the support plate 110 drives the first pressing wheel 220 and the second pressing wheel 230 to move to the left, thereby accurately moving the support plate 110 to the second limiting position.

Further, the first limiting member 440 is disposed on a upper side, the second limiting member 450 is disposed on a lower side, the rack 630 is located behind the support plate 110, a guide block 442 is disposed on a front side of the support plate 110, the guide block 442 is connected to a lower end of the first limiting member 440, and the guide block 442 is configured to restrict the support plate 110 from moving in the front-back direction.

Further, the guide block 442 extends downward to the transport channel 240, and the limiting hole 420 extends to the guide block 442, so as to play a guide function on transport of the to-be-printed consumable. It should be noted that an end of the guide block 442 is a tip end, so as to avoid the first pressing wheel 220 and the second pressing wheel 230, and interference caused by the first pressing wheel 220 and the second pressing wheel 230 moving in the left-right direction is reduced.

In addition, a lower end of the receiving groove 441 has a notch 430, so that a distance between the pushing portion 120 and the driving roller 210 in a vertical direction can be reduced. When a distance of the pushing portion 120 pushing the target consumable is fixed, the smaller the distance between the pushing portion 120 and the driving roller 210 in the vertical direction is, the larger an angle between the target consumable and the driving roller 210 (which may be derived from a triangle function) is, thereby reducing a contact area between the target consumable and the driving roller 210, and reducing an upward reverse friction force applied to the target consumable when the driving roller 210 rotates, that is, reducing interference from the driving roller 210 to the target consumable.

In one of the embodiments, the second limiting member 450 is provided with an upwardly extending stopper 460 at an upper end thereof. The stopper 460 is located on a front side of the support plate 110, and the stopper 460 is configured to restrict the support plate 110 from moving in the front-back direction.

Figure 7:
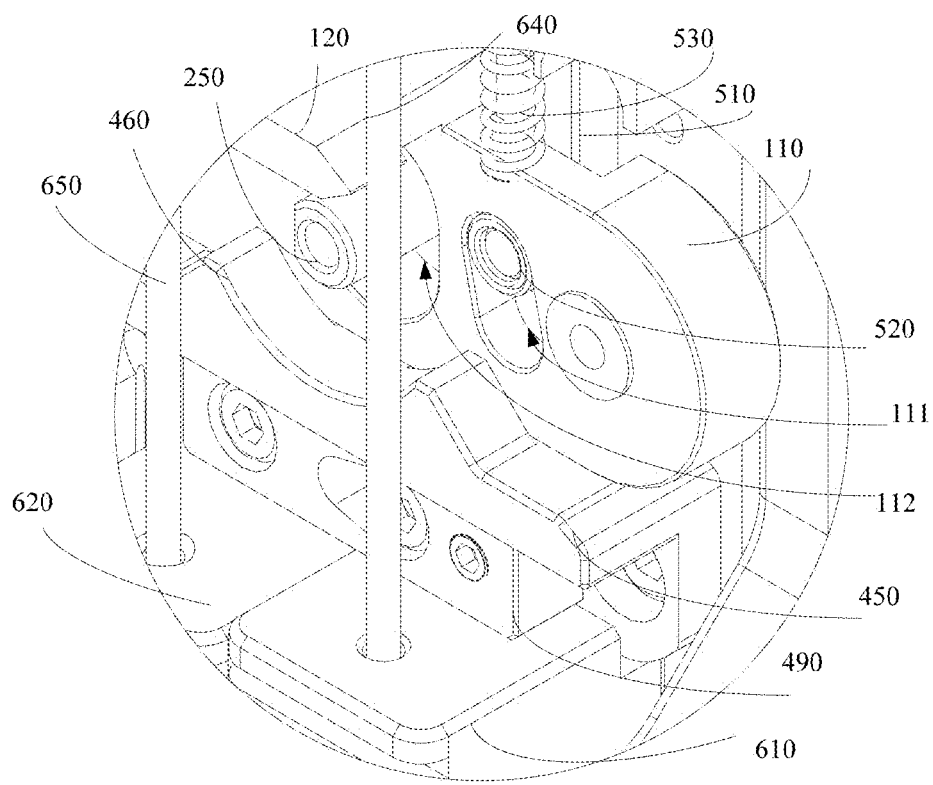
FIG. 7 is an enlarged view of portion B in FIG. 4.

Referring to FIG. 4 and FIG. 7, in one of the embodiments, the support plate 110 is provided with an avoidance hole 112 disposed in a region between the first pressing wheel 220 and the second pressing wheel 230. The switching device includes a second driving member 250. An output shaft of the second driving member 250 passes through the avoidance hole 112 and is connected to the driving roller 210, and the second driving member 250 is configured to drive the driving roller 210 to rotate in an axial direction of the second driving member 250.

Specifically, the second driving member 250 is mounted on the rack 630, the support plate 110 is disposed on a front side of the second driving member 250, and an output shaft of the second driving member 250 projects the avoidance hole 112 and is connected to the driving roller 210. The avoidance hole 112 extends in the left-right direction, so that when the support plate 110 moves in the left-right direction, the avoidance hole 112 is capable of avoiding an output shaft of the second driving member 250. In addition, taking FIG. 1 as an example, when the first consumable 640 is the target consumable, the driving roller 210 rotates counterclockwise, so that a downward driving force can be applied to the second consumable 650. When the second consumable 650 is the target consumable, the driving roller 210 rotates clockwise, so that a downward driving force can be applied to the first consumable 640. Preferably, the second driving member 250 is a motor.

Referring to FIG. 1 and FIG. 6, in one of the embodiments, the switching device further includes a first nozzle assembly 610 and a second nozzle assembly 620 that are configured to spray molten consumables. The first nozzle assembly 610 and the second nozzle assembly 620 are spaced apart in a direction perpendicular to the feeding direction. The first nozzle assembly 610 is connected to the switching member 510, and the second nozzle assembly 620 is connected to the rack 630. The switching member 510 is configured to drive the first nozzle assembly 610 to move in the feeding direction under the drive of the driving assembly 300, such that the first nozzle assembly 610 is offset from the second nozzle in a direction perpendicular to the feeding direction, and the first nozzle assembly 610 drives the pushing assembly 100 to move relative to the driving roller 210 under the drive of the driving assembly 300.

Specifically, the first nozzle assembly 610 is connected to a lower end of the switching member 510. When the driving assembly 300 drives the switching member 510 to drive the transmission block 520 to move upward, the first nozzle assembly 610 retracts upward, the support plate 110 drives the first pressing wheel 220 and the second pressing wheel 230 to move rightward, and the support plate 110 moves to the first limiting position. In this case, the first consumable 640 is the target consumable, and the second consumable 650 is the to-be-printed consumable. The first nozzle assembly 610 is in a non-operating state, and the second nozzle assembly 620 is in an operating state. When the driving assembly 300 drives the switching member 510 to drive the transmission block 520 to move downward, the first nozzle assembly 610 projects downward, the support plate 110 drives the first pressing wheel 220 and the second pressing wheel 230 to move leftward, and the support plate 110 moves to a second limiting position. In this case, the second consumable 650 is the target consumable, and the first consumable 640 is the to-be-printed consumable. The second nozzle assembly 620 is in the non-operating state, and the first nozzle assembly 610 is in the operating state. In this setting, the second nozzle and the first nozzle can be offset from each other in a horizontal direction, so that the nozzle assembly in the operating state can be prevented from scratching a model, thereby improving printing accuracy.

In addition, when the print color or material needs to be replaced, the first nozzle assembly 610 moves up and down driven by the driving assembly 300, so that the first nozzle assembly 610 and the second nozzle assembly 620 are horizontally offset from each other, so that the nozzle assembly in the non-operating state can be prevented from scratching the model. Meanwhile, the driving assembly 300 drives the support plate 110 to drive the first pressing wheel 220 and the second pressing wheel 230 to move, so that the to-be-printed consumable is switched to correspond to the nozzle assembly in the operating state, and the target consumable is switched to correspond to the nozzle assembly in the non-operating state. Therefore, when the print nozzle assembly is replaced to print different colors or materials, switching of the consumable and switching of the print nozzle are implemented synchronously through one driving assembly 300 in the present disclosure. Meanwhile, when the target consumable is switched to the to-be-printed consumable, the target consumable is maintained at the current position, thereby saving the time, and printing efficiency and printing accuracy are improved.

Referring to FIG. 1, FIG. 4, FIG. 6 and FIG. 8, FIG. 8 is an enlarged view of portion C in FIG. 4. In one of the embodiments, the driving assembly 300 includes a first driving member 310 and a cam 320. The cam 320 is connected to a power output end of the first driving member 310. The cam 320 is provided with a driving slot 330. The switching member 510 is provided with an engaging block 550. The engaging block 550 abuts against an inner wall of the driving slot 330, and the first driving member 310 is configured to drive the cam 320 to drive the engaging block 550 to move in the feeding direction.

Specifically, the engaging block 550 is connected to an upper end of the switching member 510. When the first driving member 310 drives the cam 320 to rotate in the front-back direction, the driving slot 330 of the cam 320 rotates synchronously with the cam 320, so that the position of the driving slot 330 in the up-down direction changes, and the engaging block 550 always abuts against an inner wall of the driving slot 330, so that the position of the engaging block 550 in the up-down direction can be changed. Preferably, the first driving member 250 is a motor.

In one of the embodiments, the rack 630 is provided with a second limiting slot 480 extending in the feeding direction. The switching member 510 is slidably disposed in the second limiting slot 480, and the second limiting slot 480 is configured to restrict the switching member 510 from moving in a direction other than a vertical direction.

Specifically, the second limiting slot 480 extends in the up-down direction, so as to play a guide function on the switching member 510, so that the switching member 510 moves stably upward or downward driven by the cam 320. Therefore, in a process when the transmission block 520 moves synchronously with the switching member 510, the transmission block 520 can stably apply a driving force to the slot wall of the inclined slot 111.

Further, the first limiting member 440 and the second limiting member 450 cover on a front side of the second limiting slot 480 and abut against a front side of the switching member 510, so that the switching member 510 can be restricted from moving in the front-back direction.

Further, the switching device further includes a limiting bar 490 connected to the rack 630. The limiting bar 490 extends in the left-right direction, and is located on the front side of the second limiting slot 480, and the limiting bar 490 abuts against the front side of the switching member 510. In this setting, an area in which the switching member 510 is limited can be increased, so that the switching member 510 is stably limited in the front-rear direction, therefore the stopper 460 can accurately move in a vertical direction.

Figure 8:
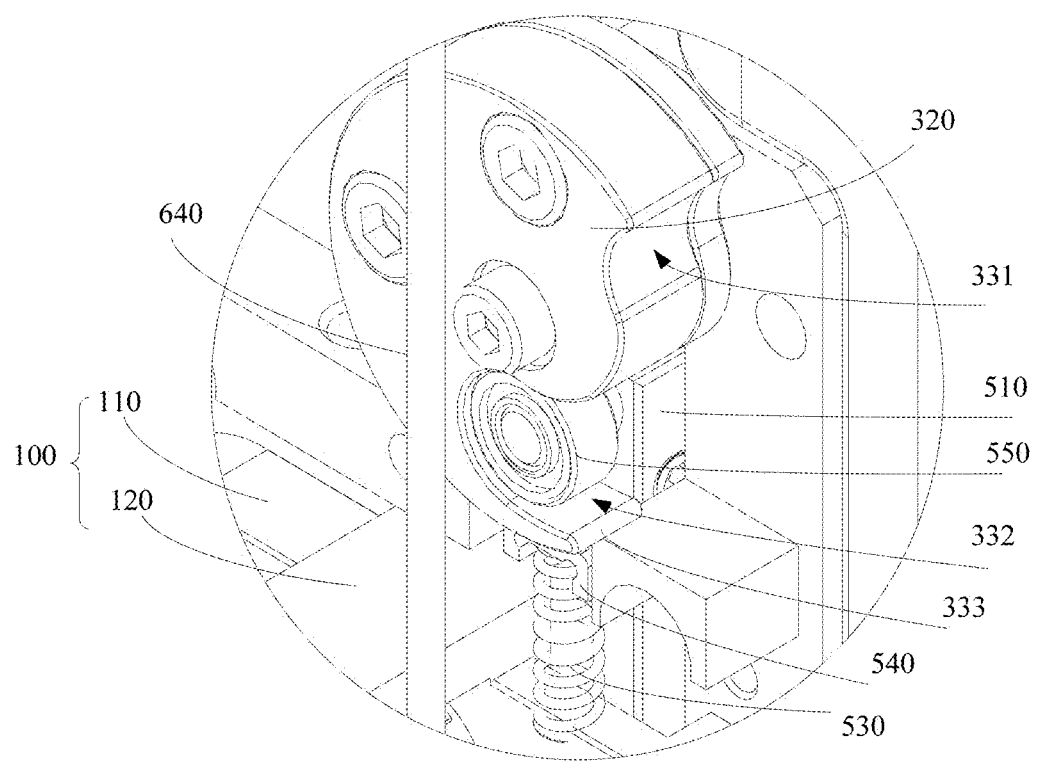
FIG. 8 is an enlarged view of portion C in FIG. 4.

Referring to FIG. 6, FIG. 7, and FIG. 8, in one of the embodiments, the transmission assembly 500 further includes an elastic member 530 and a bump 640. The bump 640 is connected to the switching member 510. One end of the elastic member 530 elastically abuts against the rack 630, and another end of the elastic member 530 elastically abuts against the bump 540. The elastic member 530 is configured to apply an upward force to the bump 540, so that a sidewall of the engaging block 550 always abuts against an inner wall of the driving slot 330.

Specifically, the driving slot 330 is an open slot, and an external side of the driving slot 330 away from the rotation center of the cam 320 is in communication with the outer atmosphere. The bump 540 is disposed above the transmission block 520, an upper end of the elastic member 530 elastically abuts against a lower end of the bump 540, and a lower end of the elastic member 530 is elastically abut against an upper end of the support plate 110. When the cam 320 drives the switching member 510 to move downward, the elastic member 530 is compressed, so that movement of the switching member 510 is more stable. When the cam 320 drives the switching member 510 to move upward, the elastic member 530 pushes the bump 540 to move upward, so that a sidewall of the engaging block 550 always abuts against an inner wall of the driving slot 330, so as to implement the movement of the switching member 510 in the up-down direction. Preferably, the elastic member 530 is a spring.

Further, the first limiting member 440 is provided with an avoidance slot 443 on a side thereof away from the guide block 442. A groove wall of the avoidance slot 443 is provided with an abutting block 444 protruding rearward. The elastic member 530 extends into the avoidance slot 443 to abut against the support plate 110. The avoidance slot 443 is configured to abut against the elastic member 530, and the abutting block 444 abuts against the switching member 510, so as to limit the movement of the switching member 510 in the front-back direction.

Referring to FIG. 4, FIG. 6, and FIG. 8, in one of the embodiments, the driving slot 330 includes the first groove 331 and the second groove 332. The first groove 331 and the second groove 332 are distributed in a circumferential direction of the cam 320, and a groove wall of the first groove 331 and a groove wall of the second groove 332 transit smoothly. When the engaging block 550 moves to abut against the groove wall of the first groove 331, the switching member 510 moves to a highest point. When the engaging block 550 moves to abut against the groove wall of the second groove 332, the switching member 510 moves to a lowest point.

Specifically, the groove wall of the first groove 331 and the groove wall of the second groove 332 transit smoothly, so that the engaging block 550 can move stably between the first groove 331 and the second groove 332, therefore the switching member 510 moves stably upward and downward. The setting of the first groove 331 and the second groove 332 can limit the movement of the engaging block 550 to the highest point and the lowest point, thereby avoiding that the cam 320 continues to drive the engaging block 550 to rotate due to inertia, thereby improving stability of the movement of the engaging block 550.

Further, a side wall of the second groove 332 on the cam 320 away from the first groove 331 forms a hook 333. When the switching member 510 moves toward the highest point, the hook 333 can hook the engaging block 550 and drive the engaging block 550 to move upward, so that the engaging block 550 stably moves upward to the highest point under action of the hook 333 and the spring, thereby avoiding a case in which a shape change of the spring is too small, so that a recovery force of the spring is too small to push the engaging block 550 upward, which results in a disengagement of the engaging block 550 and a side wall of the driving slot 330.

On the basis of the aforementioned embodiment, in the present disclosure, the driving slot 330 may be further improved, and the elastic member 530 and the bump 540 may be removed, and other parts are the same as those in the aforementioned embodiments. Therefore, details are not described again.

Figure 9:
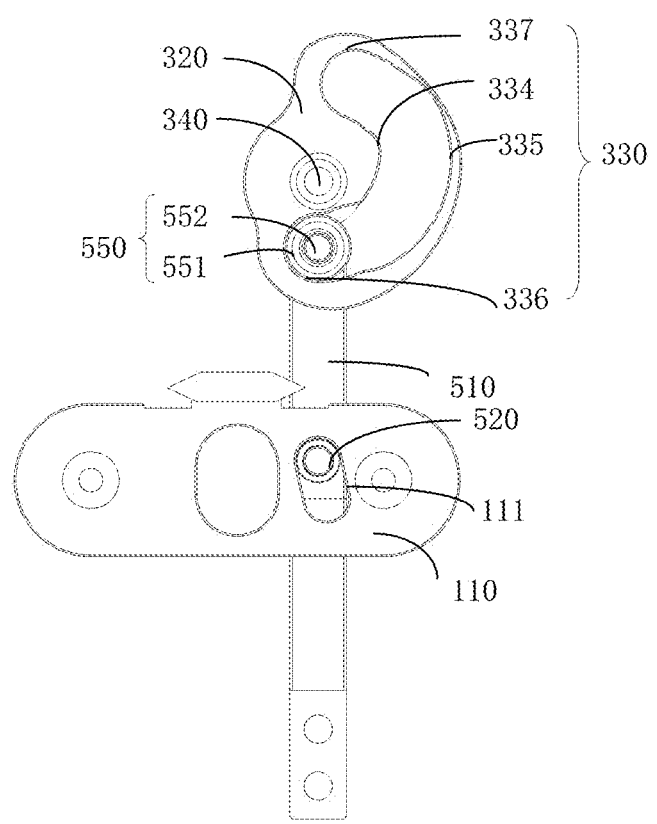
FIG. 9 is a schematic view of cooperation between a driving assembly and a transmission assembly in a dual-nozzle device according to another embodiment of the present disclosure.

Referring to FIG. 9, FIG. 9 is a schematic diagram of cooperation between the driving assembly and the transmission assembly in the dual-nozzle device according to another embodiment of the present disclosure.

In one of the embodiments, the driving slot 330 includes the first inner wall 334 and the second inner wall 335. The first inner wall 334 is located on a side of the second inner wall 335 adjacent to the rotation center 340 of the cam 320. In a moving direction of the cam 320, a space between the first inner wall 334 and the rotation center 340 of the cam 320 gradually increases, a space between the second inner wall 335 and the rotation center 340 of the cam 320 gradually increases. The first inner wall 334 is configured to abut against the engaging block 550 to push the engaging block 550 to move downward, and the second inner wall 335 is configured to abut against the engaging block 550 to pull the engaging block 550 to move upward.

Specifically, a side wall of the driving slot 330 away from the rotation center 340 of the cam 320 has a space from an outer contour edge corresponding to the cam 320, and an inner wall of the driving slot 330 forms a closed loop. Taking FIG. 7 as an example for description, in a counterclockwise direction, a distance between the first inner wall 334 and the rotation center 340 of the cam 320 gradually increase, so that in a process in which the first driving member 310 drives the cam 320 to rotate clockwise, the first inner wall 334 can abut against the engaging block 550, and push the engaging block 550 to move downward until the engaging block 550 abuts against an end portion of the driving slot 330. At this time, a distance between the engaging block 550 and the rotation center 340 of the cam 320 is the farthest. In a counterclockwise direction, a distance between the second inner wall 335 and the rotation center 340 of the cam 320 gradually increase, so that in a process in which the first driving member 310 drives the cam 320 to rotate clockwise, the first inner wall 334 can abut against the engaging block 550, and push the engaging block 550 to move upward until the engaging block 550 abuts against an end portion of the driving slot 330. At this time, a distance between the engaging block 550 and the rotation center 340 of the cam 320 is the shortest. In the present disclosure, the engaging block 550 is completely driven by an inner wall of the driving slot 330 to implement movement in the up-down direction. Compared with manners in which other auxiliary components such as the elastic member 530 are provided, the engaging block 550 moves more stably, and the structure can be simplified.

Referring to FIG. 9, in one of the embodiments, the driving slot 330 further includes a third inner wall 336 and a fourth inner wall 337. The third inner wall 336 and the fourth inner wall 337 are located at two end portions of the driving slot 330 in a moving direction of the cam 320. The first inner wall 334 and the second inner wall 335 are located between the third inner wall 336 and the fourth inner wall 337. The third inner wall 336 and the fourth inner wall 337 are adapted to a shape of the engaging block 550, and the third inner wall 336 and the fourth inner wall 337 are configured to abut against the engaging block 550 to restrict the engaging block 550 from moving relative to the cam 320.

Specifically, taking FIG. 9 as an example for description, the third inner wall 336 is located at a lower end of driving slot 330, and the fourth inner wall 337 is located at an upper end of driving slot 330. When the engaging block 550 abuts against the third inner wall 336, the engaging block 550 is located at a highest point, and when engaging block 550 abut against the fourth inner wall 337, the engaging block 550 is located at a lowest point. By setting the third inner wall 336 and fourth inner wall 337 abut against the engaging block 550, the cam 320 can be restricted from rotating sequentially due to inertia, thereby improving stability. The setting that the third inner wall 336 and the fourth inner wall 337 are adapted to the shape of the engaging block 550 can reduce stress concentration and improve the service life of the cam 320.

Further, two ends of the third inner wall 336 are connected to and extend to the first inner wall 334 and the second inner wall 335 respectively, and two ends of the fourth inner wall 337 are connected to and extend to the first inner wall 334 and the second inner wall 335 respectively, so that the engaging block 550 moves more smoothly.

Referring to FIG. 9, in one of the embodiments, a distance between the first inner wall 334 and the second inner wall 335 is greater than an outer contour size of the engaging block 550, so that when the engaging block 550 abut against the first inner wall 334, there is an interval between the engaging block 550 and the second inner wall 335. When the first inner wall 334 drives the engaging block 550 to move, friction between the engaging block 550 and the second inner wall 335 can be avoided, so that the engaging block 550 can move more smoothly. When the engaging block 550 abut against the second inner wall 335, there is an interval between the engaging block 550 and the first inner wall 334. When the second inner wall 335 drives the engaging block 550 to move, friction between the engaging block 550 and the first inner wall 334 can be avoided, so that the engaging block 550 can move more smoothly.

Referring to FIG. 9, in one of the embodiments, the driving slot 330 extends through the cam 320 in a thickness direction thereof, and the engaging block 550 is received in the driving slot 330, so that an area in which the engaging block 550 contacts an inner wall of the driving slot 330 can be reduced. That is, the engaging block 550 only needs to contact the first inner wall 334, second inner wall 335, third inner wall 336, or fourth inner wall 337 of the driving slot 330, so that friction between the engaging block 550 and the inner wall of the driving slot 330 is reduced, and the engaging block 550 moves more smoothly.

Referring to FIG. 9, in one of the embodiments, the engaging block 550 includes a protrusion portion 552 and a bearing 551. The protrusion portion 552 is connected to the switching member 510, the bearing 551 is connected to the protrusion portion 552, and the bearing 551 is configured to abut against an inner wall of driving slot 330.

Specifically, both the third inner wall 336 and the fourth inner wall 337 are arc-shaped. When the cam 320 rotates relative to the engaging block 550, the bearing 551 rotates relative to the cam 320, thereby reducing the friction between the engaging block 550 and a cam wall of the cam 320, so that the switching member 510 moves more stably.

Referring to FIG. 1, FIG. 4, FIG. 5, and FIG. 6, an embodiment of the present disclosure provides a 3D printing device, including the aforementioned switching device. In the present disclosure, the driving assembly 300 drives the switching member 510 to move upward and downward, and drives the first nozzle assembly 610 to move upward and downward, so that the first nozzle assembly 610 and the second nozzle assembly 620 are offset from each other in the horizontal direction, so that the nozzle assembly in the operating state can be prevented from scratching the model, thereby improving printing accuracy. In a process of the switching member 510 moving upward and downward, the support plate 110 is driven by the switching member 510 to move in the left-right direction and drives the pushing portion 120 to move synchronously to push the target consumable to the preset position, and the support plate 110 abuts the target consumable against the corresponding limiting wall 421, so that the target consumable is not interfered by rotation of the driving roller 210. Therefore, when switching the print nozzle assembly, the to-be-printed consumable does not need to be re-adjusted, thereby improving printing efficiency. In addition, the first pressing wheel 220 and the second pressing wheel 230 move synchronously with the support plate 110, so that the target consumable can be relaxed by the driving roller 210 and the corresponding pressing wheel, further reducing interference of the driving roller 210 to the target consumable. In addition, the to-be-printed consumable is compressed by the driving roller 210 and the corresponding pressing wheel, and a driving force of the driving roller 210 on the to-be-printed consumable is increased, thereby facilitating transport of the to-be-printed consumable and improving printing efficiency.

Referring to FIG. 1 and FIG. 2, in one of the embodiments, the 3D printing device further includes a heat dissipation assembly 700. The heat dissipation assembly 700 includes a heat dissipation member 710, a first air guide member 720, and a heat dissipation block 730. The venturis of the first nozzle assembly 610 and the second nozzle assembly 620 are all provided with heat dissipation blocks 730. The heat dissipation member 710 is configured to generate cold air. An outlet of the heat dissipation member 710 is in communication with an inlet of the first air guide member 720. The air vent 740 of the first air guide member 720 is aligned with the heat dissipation block 730. The cold air is blown from the air vent 740 of the first air guide member 720 toward the heat dissipation block 730 through the first air guide member 720, so as to dissipate heat from the first nozzle assembly 610 and the second nozzle assembly 620. Preferably, there are two first air guide members 720. Outlets of the two first air guide members 720 are respectively corresponding to a heat dissipation block 730, and the two heat dissipation blocks 730 are located between the two first air guide members 720.

Referring to FIG. 1 and FIG. 2, in one of the embodiments, the 3D printing device further includes a cooling assembly 800. The cooling assembly 800 includes a cooling member 810 and a second air guide member 820. The cooling member 810 is configured to generate cold air. An outlet of the cooling member 810 is in communication with an inlet of the second air guide member 820. The cooling port 830 of the second air guide member 820 is aligned with the nozzles of the first nozzle assembly 610 and the second nozzle assembly 620. The cold air is blown from the cooling port 830 of the second air guide member 820 toward the nozzles, so as to dissipate heat from the consumable sprayed out from the nozzles, thereby speeding up cooling of the printing model and improving printing efficiency. Preferably, there are two second air guide members 820. The cooling ports 830 of the two second air guide members 820 face the first nozzle 660 of the first nozzle assembly 610 and the second nozzle 670 of the second nozzle assembly 620 respectively, and the first nozzle 660 and the second nozzle 670 are located between the two second air guide members 820.

The above embodiments merely illustrates several embodiments of the present disclosure, and the description thereof is specific and detailed, but it shall not be constructed as limiting the scope of the disclosure. It should be noted that, for a person of ordinary skill in the art, several variations and improvements may be made without departing from the concept of the present disclosure, and these are all within the protection scope of the present disclosure. Therefore, the protection scope of the present disclosure shall be subject to the appended claims.

What is claimed is:

1. A switching device for a three-dimensional (3D) printing apparatus, comprising:
 a rack;
 an extrusion assembly connected to the rack and comprising a driving roller, and a first pressing wheel and a second pressing wheel located on a circumferential outer side of the driving roller, and transport channels allowing consumables to pass being formed between the driving roller and the first pressing wheel and between the driving roller and the second pressing wheel;
 a driving assembly connected to the rack;
 a pushing assembly connected to rack and comprising a pushing portion, wherein the pushing portion is capable of pushing a target consumable to move relative to driving roller to a preset position corresponding to the target consumable under a drive of the driving assembly, so as to restrict the target consumable from moving, wherein the target consumable is one of the consumables located in different transport channels; and wherein the pushing assembly further comprises a support plate connected to a power output end of the driving assembly, the first pressing wheel and the second pressing wheel are mounted on the support plate, and the pushing portion is connected to the support plate; wherein the support plate has a first limiting position and a second limiting position, and the support plate is configured to drive the first pressing wheel and the second pressing wheel to move reciprocally between the first limiting position and the second limiting position under the drive of the driving assembly.

2. The switching device according to claim 1, further comprising two limiting walls, wherein setting positions of the two limiting walls are in a one-to-one correspondence with setting positions of the two transport channels, and when the target consumable is located at a preset position corresponding to the target consumable, the pushing portion abuts against the limiting wall corresponding to the target consumable.

3. The switching device according to claim 2, wherein the two limiting walls are opposite arranged, the pushing portion is located between the two limiting walls, and the pushing portion is capable of moving reciprocally between the two limiting walls under the drive of the driving assembly, such that the target consumable abuts against the limiting wall corresponding to the target consumable.

4. The switching device according to claim 3, further comprising a first limiting member connected to the rack, wherein the first limiting member is provided with two limiting holes extending in a feeding direction of the consumables, and the two limiting holes are located on extension lines of the two transport channels, respectively;
wherein the first limiting member is further provided with a receiving groove, the receiving groove is located between two limiting holes and form a space allowing the pushing portion to move reciprocally between the two limiting walls, and each hole wall of the limiting hole is provided with a notch in communication with the receiving groove;
wherein the limiting wall is formed on a part of the hole wall of the limiting hole on a side opposite to the notch, when the pushing portion moves reciprocally between two limiting walls, the pushing portion enters the limiting hole through the notch, so as to cooperate with the corresponding limiting wall to abut against the target consumable.

5. The switching device according to claim 4, wherein when the support plate moves to the first limiting position, the pushing portion and one of the limiting walls clamp a current target consumable, and the first pressing wheel and the driving roller cooperate to perform a feed operation on the consumables except the target consumable; when the support plate is located on the second limiting position, the pushing portion and the limiting walls clamp the current target consumable, and the second pressing wheel and the driving roller cooperate to perform the feed operation on the consumables except the target consumable; wherein the current target consumable is a consumable in the consumables that is squeezed by the pushing portion.

6. The switching device according to claim 4, further comprising a transmission assembly, the transmission assembly comprising a transmission block and a switching member, the switching member being connected to a power output end of the driving assembly, the transmission block being disposed on the switching member, the pushing assembly being provided with an inclined slot, the transmission block being inserted into the inclined slot, and when the driving assembly drives the switching member to move, the transmission block is capable of pushing a slot wall of the inclined slot, so as to move the pushing assembly relative to the driving roller.

7. The switching device according to claim 6, wherein the rack is provided with a first limiting slot extending in a direction perpendicular to the feeding direction, the pushing assembly is slidably disposed in the first limiting slot, and the first limiting slot is configured to restrict the pushing assembly from moving in the feeding direction.

8. The switching device according to claim 6, further comprising a first nozzle assembly and a second nozzle assembly that are configured to spray molten consumables, wherein the first nozzle assembly and the second nozzle assembly are spaced apart in a direction perpendicular to the feeding direction, the first nozzle assembly is connected to the switching member, and the second nozzle assembly is connected to the rack;
wherein the switching member is configured to drive the first nozzle assembly to move in the feeding direction under the drive of the driving assembly, such that the first nozzle assembly is offset from the second nozzle assembly in the direction perpendicular to the feeding direction, while the first nozzle assembly pushes the pushing assembly to move relative to the driving roller.

9. The switching device according to claim 6, wherein the driving assembly comprises a first driving member and a cam, the cam is connected to a power output end of the first driving member, the cam is provided with a driving slot, the switching member is provided with an engaging block, the engaging block abuts against an inner wall of the driving slot, and the first driving member is configured to drive the cam to drive the engaging block to move in the feeding direction.

10. The switching device according to claim 9, wherein the transmission assembly further comprises an elastic member and a bump, the bump is connected to the switching member, one end of the elastic member elastically abuts against the rack, another end of the elastic member elastically abuts against the bump, the elastic member is configured to apply an upward force to the bump, so that a sidewall of the engaging block always abuts against an inner wall of the driving slot.

11. The switching device according to claim 9, wherein the driving slot comprises a first inner wall and a second inner wall, the first inner wall is located on a side of the second inner wall adjacent to a rotation center of the cam, in a moving direction of the cam, a space between the first inner wall and the rotation center of the cam gradually increases, a space between the second inner wall and the rotation center of the cam gradually increases, the first inner wall is configured to abut against the engaging block to push the engaging block to move downward, and the second inner wall is configured to abut against the engaging block to pull the engaging block to move upward.

12. The switching device according to claim 11, wherein the driving slot further comprises a third inner wall and a fourth inner wall, the third inner wall and the fourth inner wall are located at two end portions of the driving slot in a moving direction of the cam, the first inner wall and the second inner wall are located between the third inner wall and the fourth inner wall, the third inner wall and the fourth inner wall are adapted to a shape of the engaging block, and the third inner wall and the fourth inner wall are configured to abut against the engaging block to restrict the engaging block from moving relative to the cam.

13. The switching device according to claim 11, wherein a distance between the first inner wall and the second inner wall is greater than an outer contour size of the engaging block.

14. The switching device according to claim 9, wherein the driving slot extends through the cam in a thickness direction thereof, and the engaging block is received in the driving slot.

15. A 3D printing apparatus, comprising the switching device according to claim 1.

* * * * *